United States Patent
Morgan

(10) Patent No.: US 6,812,263 B1
(45) Date of Patent: Nov. 2, 2004

(54) POLYVINYL CHLORIDE-BASED ELEMENTS FOR FLOOR CLEANING UNITS

(75) Inventor: John J. Morgan, Louisville, OH (US)

(73) Assignee: The Hoover Company, North Canton, OH (US)

( * ) Notice: Subject to any disclaimer, the term of this patent is extended or adjusted under 35 U.S.C. 154(b) by 1 day.

(21) Appl. No.: 10/613,197

(22) Filed: Jul. 3, 2003

(51) Int. Cl.[7] .............................. C11D 17/00; C08J 9/00
(52) U.S. Cl. ........................ 521/90; 510/403; 510/404; 521/140; 521/145
(58) Field of Search ................................. 510/403, 404; 521/90, 140, 145

(56) References Cited

U.S. PATENT DOCUMENTS

| | | |
|---|---|---|
| 3,396,978 A | 8/1968 | Balkin et al. |
| 3,419,511 A | 12/1968 | Condo et al. |
| 4,043,958 A | 8/1977 | Whelan |
| 4,454,250 A | 6/1984 | Florence et al. |
| 4,594,367 A | 6/1986 | Geissel et al. |
| 4,716,618 A | 5/1988 | Yasukawa et al. |
| 4,764,552 A | 8/1988 | Falk et al. |
| 4,900,771 A | 3/1990 | Gerace et al. |
| 5,157,076 A | 10/1992 | Greenlee et al. |
| 5,200,467 A | 4/1993 | Lordi et al. |
| 5,362,787 A | 11/1994 | Ngoc |
| 5,686,147 A | 11/1997 | Ngoc |
| 5,776,993 A | 7/1998 | Shin et al. |
| 6,043,318 A | 3/2000 | Hardiman et al. |
| 6,054,524 A | 4/2000 | Breton et al. |
| 6,254,956 B1 * | 7/2001 | Kjellqvist et al. ............ 428/44 |
| 6,271,301 B1 | 8/2001 | Weng et al. |
| 6,303,666 B1 * | 10/2001 | Yorita et al. .................. 521/79 |
| 6,333,386 B1 | 12/2001 | Nishiyama et al. |
| 6,391,963 B1 | 5/2002 | Nishiyama |
| 2001/0051241 A1 | 12/2001 | Kanbe et al. |
| 2002/0068786 A1 | 6/2002 | Graefe et al. |

* cited by examiner

*Primary Examiner*—Morton Foelak
(74) *Attorney, Agent, or Firm*—Renner, Kenner, Greive, Bobak, Taylor & Weber

(57) ABSTRACT

Formulations of polyvinyl chloride blended with nitrile rubber are provided. These formulations have been found to be useful in floor cleaning units, and provide a cost savings benefit, while meeting the physical and chemical property demands for the floor cleaning unit parts into which they are formed.

3 Claims, 11 Drawing Sheets

POLYVINYL CHLORIDE-BASED ELEMENTS FOR FLOOR CLEANING UNITS

BACKGROUND OF THE INVENTION

The present invention generally relates to soft-durometer compounds of polyvinyl chloride (PVC) and nitrile rubber (NBR). More particularly, this invention relates to PVC/NBR compounds useful in sealing members, mounts, tubing and contact members in floor cleaning units.

The seals, mounts, tubing and contact members that are common in many of the presently available floor cleaning units are generally formed from thermoplastic vulcanizate compounds. Although the requisite physical and chemical properties of these elements are different for each specific application, it will be appreciated that these elements are made from compounds of low to medium range durometer inasmuch as it is necessary that such elements be flexible and compressible, with compression set being particularly important for the seals, mounts and contact members, and flexibility being particularly important for tubing (wherein the durometer of the rubber compound may be higher, i.e., harder, than that for seals, mounts and contact members).

While these various elements are currently formed from materials having acceptable chemical and physical properties, there is always a drive for cost savings in the production of any end product, and the present invention focuses upon providing elements for floor cleaning units at an appreciable cost savings. Under current technology, the elements of concern are generally formed of thermoplastic compounds that are processed with appropriate fillers, lubricants, and other processing aids to provide the desired physical and chemical properties. However, in many cases, the thermoplastics employed and/or the processes for formulating the desired thermoplastic compounds are costly.

Polyvinyl chloride is widely available and is generally less expensive than the materials commonly compounded to create the seals, mounts, tubing and contact members of many floor cleaning units. However, PVC has a poor compression set and poor flexibility, and therefore, without some alteration, PVC is not suitable for the fabrication of such elements. The present invention employs PVC-based compounds modified with nitrile rubber for the provision of seals, mounts, tubing and contact members in floor cleaning units, without sacrificing, and, at times, improving upon the physical and/or chemical properties of the end product element.

SUMMARY OF THE INVENTION

In general, the present invention provides floor cleaning units that include at least one PVC/NBR component selected from the group consisting of seals, mounts, tubing, and contact members. The PVC/NBR component includes a polyvinyl chloride base resin and, based upon 100 parts by weight of said polyvinyl chloride base resin:
  (a) from about 10 to about 50 parts nitrile rubber, as an impact modifier;
  (b) from about 30 to about 100 parts plasticizer; and
  (c) from about 1 to about 4 parts polyvinyl chloride stabilizer.

In a particular contact member embodiment, the present invention provides a floor cleaning unit that includes a contact member including a polyvinyl chloride base resin and, based upon 100 parts by weight of said polyvinyl chloride base resin:
  (a) from about 20 to about 40 phr nitrile rubber,
  (b) from about 60 to about 100 phr plasticizer,
  (c) from about 1 to about 5 phr polyvinyl chloride stabilizer,
  (d) from about 10 to about 15 phr epoxide plasticizer,
  (e) from about 0.05 to about 0.4 phr internal lubricant, and
  (f) from about 0.7 to about 1.5 phr external lubricant.

In a particular sealing member embodiment, the present invention provides a floor cleaning unit that includes a sealing member including a polyvinyl chloride base resin and, based upon 100 parts by weight of said polyvinyl chloride base resin:
  (a) from about 20 to about 40 a phr of nitrile rubber,
  (b) from about 60 to about 100 phr of plasticizer,
  (c) from about 1 to bout 5 phr of polyvinyl chloride stabilizer, and
  (d) from about 10 to about 15 phr of epoxide plasticizer.

To facilitate molding of these sealing members, the following ingredients may also be added:
  (e) from about 0.05 to about 0.4 phr internal lubricant, and
  (f) from about 0.7 to about 1.5 phr external lubricant.

In another embodiment, a foamed sealing member is provided. A floor cleaning unit includes a foamed sealing member including a polyvinyl chloride base resin and, based upon 100 parts by weight of said polyvinyl chloride base resin:
  (a) from about 20 to about 40 phr of nitrite rubber,
  (b) from about 75 to about 125 phr of plasticizer,
  (c) from about 1 to about 5 phr of polyvinyl chloride stabilizer,
  (d) from about 10 to about 15 phr of epoxide plasticizer, and
  (e) from about 0.5 to about 1.5 phr of blowing agent.

In yet another embodiment, tubing is provided. A floor cleaning unit includes tubing including a polyvinyl chloride base resin and, based upon 100 parts by weight of said polyvinyl chloride base resin:
  (a) from about 20 to about 40 phr of NBR;
  (b) from about 50 to about 80 phr of plasticizer;
  (c) from about 1 to about 5 phr of PVC stabilizer;
  (d) from about 3 to about 8 phr of epoxide plasticizer;
  (e) from about 5 to about 15 phr filler;
  (f) from about 0.05 to about 0.4 phr internal lubricant; and
  (g) from about 0.5 to about 1.2 phr external lubricant.

A process for producing soft durometer polyvinyl chloride compounds such as those provided above is also provided. The process includes the sequential steps of adding PVC resin to a mixer and heating, under agitation, to a temperature of from about 140° F. to about 170° F.; adding plasticizer and stabilizer to the PVC resin and raising the temperature to from about 185° F. to about 195° F.; adding at least one ingredient selected from fillers, blowing agents, pigments, internal lubricants and external lubricants and raising the temperature to from about 220° F. to about 240° F.; transferring the resultant mixture to a cooling mixer and lowering the temperature to the range of from about 120° F. to about 70° F.; adding nitrite rubber to the cooled mixture; and feeding the resultant nitrile rubber mixture to an extruder to shear and fuse the mixture at a temperature of from about 280° F. to about 350° F. The nitrite rubber mixture may be formed into pellets at the extruder, and the pellets may subsequently be formed into any of the useful parts for floor cleaning units.

DETAILED DESCRIPTION OF THE INVENTION

Figure 1:
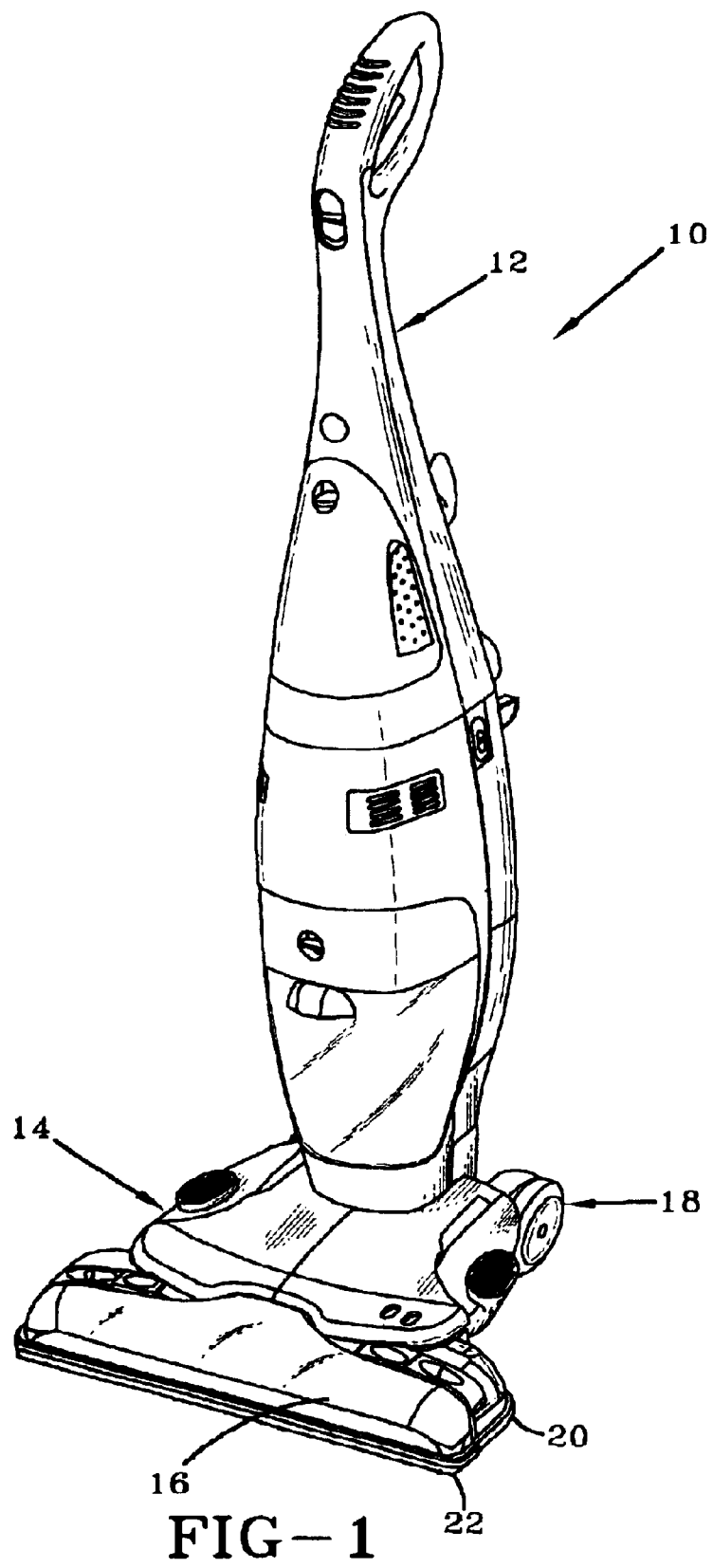
FIG. 1 is a perspective view of a hard floor cleaning unit including a contact members according to this invention.

It has been found that polyvinyl chloride (PVC), when modified with nitrile rubber (NBR), can be employed, at significant cost savings, as seals, mounts, tubing and contact members in floor cleaning units. In such applications, it is desirable that the material from which these parts are fabricated be of soft durometer, preferably below 55 durometer, because the flexibility of the material is important to provide a mating surface that will conform to the connecting surface to give an air tight or leak proof connection. In seals, mounts, and contact member applications, the compression set of the material is also important, and should preferably range from about 49 to about 80% (ASTM D395 Method B). The tensile strength preferably ranges from about 1220 to 2720 psi, and the elongation at break preferably ranges from about 140 to 520%. Particularly, useful PVC/NBR compounds in accordance with these properties have been provided including, based upon 100 parts by weight PVC:

(a) from about 10 to about 50 parts NBR, as an impact modifier;

(b) from about 30 to about 100 parts plasticizer; and (c) from about 1 to about 4 parts PVC stabilizer.

Realizing that, in certain applications, a foamed product might be desired or necessary, additional useful compounds have been found to further include from about 0.5 to about 3 parts blowing agent, based upon 100 parts by weight PVC. Further useful compounds have been found to include from about 0.2 to about 3 parts of a lubricant, based upon 100 parts by weight PVC. The addition of a lubricant is particularly desirable when it is necessary that the element being provided exhibit reduced friction as it comes into contact with other elements/surfaces. Rope seals, bumpers, guards and squeegees are a few examples of elements that benefit from the inclusion of lubricants. In yet other applications, it might be desired to provide an element of a floor cleaning unit with an increased hardness, and typical fillers, such as calcium carbonate may be employed, in amounts ranging from about 5 to about 15 phr, in order to increase the hardness of a manufactured part. Herein, a tubing formulation employs calcium carbonate. The notation "phr" will be employed in the remainder of this disclosure, for the purpose of disclosing the amounts of the various components employed as based upon one hundred parts polyvinyl chloride resin.

PVC is a synthetic thermoplastic polymer exhibiting good weather resistance and dimensional stability, and is resistant to most acids, fats, petroleum hydrocarbons, and fungus. The PVC may be derived from the free radical polymerization of vinyl chloride with a peroxide initiator, and may be polymerized with up to about 15% of other vinyls. In this invention, the PVC resin component may be selected from any of the known general-purpose or dispersion-grade PVC resins. This group includes resins classified as high, medium and low molecular weight, and can be identified by inherent viscosities ranging from about 0.6 to about 1.2 (ASTM D1243). A higher molecular weight resin is preferred over a lower, because mechanical properties of the end product will generally improve with increasing molecular weight. Inherent viscosities depend upon molecular weight, and it is preferred that the inherent viscosity of the PVC resin component range from about 1.0 to about 1.15. (Units?)

Nitrile rubber is employed herein as an impact modifier for the PVC resin component. The nitrile rubbers are synthetic rubbers that are commonly derived from the random polymerization of acrylonitrile with butadiene by free radical catalysis. Nitrile rubbers may be created or purchased having differing levels of bound acrylonitrile, and, for purposes of the present invention, it is desired that the bound acrylonitrile content be in the range of from about 25 to about 32%. In this invention, the preferred nitrile rubber component is an acrylonitrile/butadiene copolymer.

A plasticizer is necessary for each application herein because it contributes to the workability of the formulation and the flexibility of the end product. Generally, any vinyl resin plasticizer maybe employed. Useful plasticizers in accordance with this invention may be selected from phthalates, particularly phthalate esters; epoxides, such as soybean oil and linseed oil; adipates, such as DOA, DINA, and DIDA; trimellitates, such as dicyclohexyl phthalate, tri(2-ethyhexyl)trimellitates, and dipropylene glycol dibenzoate; esters of aliphatic dibasic acids; phosphates; and polyesters. Mixtures of the forgoing may also be employed. Phthalates and combinations thereof are particularly preferred. Jayflex 251 (ExxonMobile, USA), a mixture of phthalates, is a particularly preferred plasticizer.

Notably, the epoxides are primarily used as adjuvant heat stabilizers and enhancements for light stability in vinyl compositions. However, as compatible liquids, they also contribute plasticizing action to the vinyl composition. The plasticizer element is disclosed as being employed at a range of from about 30 to about 100 phr (based on 100 parts by weight PVC), typically will include from about 3 to about 20 phr of epoxide plasticizer, preferably soybean oil.

A PVC stabilizer is necessary to inhibit the degradation that unmodified PVC would undergo at the desired processing temperatures. Stabilizers also serve to react with any hydrogen chloride that is liberated during processing of the PVC, and stabilizers can prevent the formation of color in the vinyl chloride as it is processed. The stabilizer system is mainly determined by cost and environmental concerns. Useful stabilizers may include metals such as lead or tin, and mixed metal stabilizer systems, which are generally known, may be employed as well. Plastistab 2303 (OMG Americas, USA), a triphenylphosphite believed to also contain barium and zinc (to react with HCl from the degradation of PVC), is a particularly preferred stabilizer.

When the end product produced according to this invention is to be of lesser density or is to be employed as a rope seal or guard, a foamed product may be desired, and blowing agents are employed as discussed below. Blowing agents for use herein may be selected from azodicarbonamide, azobisisobutyronitrile, 4,4'-oxybis (benzenesulfonhydrazide), and toluenesulfonyl semicarbazide. Bayer Porofor ADC/M-C1 (Bayer, USA), an azodicarbonamide, is a particularly preferred blowing agent. It decomposes typically at about 210 to 215 C., but this decomposition temperature can be reduced by an activator, such as zinc. Azodicarbonamide is particularly preferred because it leaves an odorless, non-toxic residue, and is non-staining and non-discoloring.

When the parts produced according to this invention are through extrusion or injection molding, lubricants should be employed. Lubricants are generally fatty acids or their metallic or organic esters, and are generally classified as internal or external in performance. Most lubricants will provide different degrees of both internal and external lubrication, with internal lubrication being understood to refer to intermolecular chain slippage, and external lubrication being understood to refer to the degree of friction between the fabricated part and a surface of contact. Useful lubricants may be selected from stearic acid, erucamide wax, and calcium stearate, and mixtures thereof.

To reduce compound costs or to impart desirable characteristics, fillers may optionally be added to the proposed formulation herein. Fillers are generally inorganic fine powders, such as calcium carbonate, clay, talc, barium sulfate, and the like. In particular embodiments herein, calcium carbonate is employed mainly to reduce the cost of the formulation (i.e., as an extender); however, a fine ground calcium carbonate also will increase tensile strength and tensile modulus.

Other common ingredients might be included as, for example pigments, processing aids, and flame retardants. If employed, they would be present in standard amounts appropriate for a given application.

The predominant method for coloring vinyls is with pigments. Herein, a pigment is considered as an insoluble material that has a particulate structure and that can selectively absorb and reflect the rays of incident light or confer opacity to the formulation, or both. Vinyl pigments and their use will be generally appreciated by those of ordinary skill in the art. Processing aids generally included acrylics, styrene-acrylonitrile copolymers, and chlorinated polyethylenes.

In the invention herein, various PVC/NBR formulations are provided for use as seals, mounts, tubing and contact members in floor cleaning units. These component parts of the floor cleaning units may be extruded or injection molded from the compounded PVC/NBR, and the compounded PVC/NBR is preferably provided as pellets for use in extruders or injection molding machines.

The primary aim of the process herein is to have the plasticizer uniformly absorbed by the PVC resin so that, when fusion occurs, a homogeneous, gel-free product results. Uniform incorporation of the additional ingredients (stabilizers, lubricants, fillers, pigments, process aids, etc.) is also desirable. A dry-blending process has been found to be most useful for producing the PVC/NBR formulations in accordance with the above, and this process is now disclosed.

First, the PVC resin is added to a mixer, agitated, and heated to a temperature of from about 140 to about 170° F., in order to provide the PVC in a form more receptive to the introduction and incorporation of the additional ingredients, particularly the liquid ingredients. When the designated temperature is reached, the plasticizer (including epoxide plasticizer, as discussed above) and stabilizer are added, and the temperature is raised to a temperature of from about 185 to about 195° F. so that maximum absorption of the liquids, by the resin, is reached. At this increased temperature, fillers, blowing agents, pigments, and lubricants (if any of these ingredients are employed) are added and agitated while raising the temperature to from about 220 to about 240° F. Thereafter, the mixture is transferred to a cooling mixer, where the temperature is lowered to the range of from about 120 to about 70° F. The nitrile rubber is then added to the cooled mixture and mixed for about 2 to 5 minutes. The resultant PVC/NBR formulation is transferred to a holding bin from which it is fed to an extruder. The extruder shears the formulation and fuses the powdered, dry blend at a temperature of from about 280 to about 350° F. The formulation is pelletized by the extruder, at a face-cutting die. As mentioned, the pellets may be extruded or injection molded into useful parts for floor cleaning units.

Applications for the PVC/NBR formulations disclosed above have been found to exist in the art of floor cleaning units, including vacuums, upright carpet extractors, and hard floor cleaning units. The following disclosure identifies particular parts that might be formed from the PVC/NBR formulations, and provides specific, particularly preferred formulations for the fabrication of such parts. However, it should be appreciated that the general formulation provided above might be useful for a number of different applications in which flexible parts currently comprised of rubber might benefit (from a cost standpoint or otherwise) from the ability to create the part from a PVC/NBR formulation. Herein, as mentioned, the focus is on employing the formulations in seals, mounts, tubing and contact members in floor cleaning units.

A contact member according to this invention encompasses squeegees, cushion bumpers and guards, and wheel treads, and may include other items employed in constant contact with a work surface or intended to protect elements of a floor cleaning unit from damaging or being damaged by contact with a structural member. In a specific embodiment herein, it has been found that the PVC/NBR formulation according to this invention provides a squeegee material that has a longer life than the common thermoplastic elastomer-based squeegees of the prior art. A particular application for the present PVC-based squeegee resides in the nozzle assembly of hard floor cleaning units, such as that disclosed in pending application Ser. No. 2003/0051310, of Mar. 20, 2003, incorporated in its entirety herein by reference.

Figure 2:
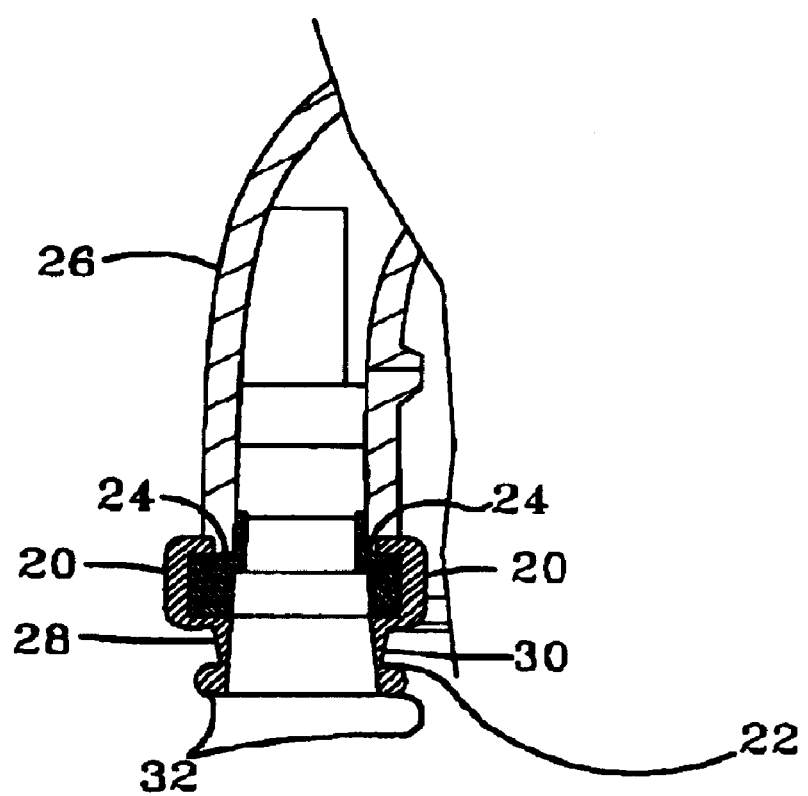
FIG. 2 is sectional view of the nozzle assembly portion of the hard floor cleaning unit of FIG. 1.

Referring now to FIGS. 1 and 2, it can bee seen that contact members according to this invention may be incorporated into a hard floor cleaner designated generally by the numeral 10. Hard floor cleaning unit 10, includes an upright handle assembly 12, pivotally connected to the rear portion of a base assembly 14, which moves and cleans along a surface. Base assembly 14 includes a nozzle assembly 16, at a front end thereof, and wheels 18, at a rear end thereof. Bumpers or furniture guards 20 are overmolded on the lower edges of the front end of base assemble 14. Nozzle assembly 16 provides a squeegee 22 for contacting a floor surface to be cleaned. Wheels 18, bumpers 20 and squeegee 22 are contact members.

In the cross-sectional view of FIG. 2, Nozzle assembly 16 includes an elastomeric squeegee 22 attached around a retainer 24 that is mounted to the bottom of the nozzle body 26. Squeegee 22 includes front and rear integrally molded blades or lips 28, 30 that have bumps 32 along the outer surface of the bottom edges. Bumps 32 serve to raise the leading squeegee lip to allow air and liquid to flow beneath the lip between the bumps. Yet, the trailing lip bends out and cleanly wipes the floor with its inside edge to keep liquid in the high suction area between lips 28,30. Bumps 32 are formed adjacent the bottom edges of each lip 28,30 so that there is a relatively thin cross section of each lip 28,30 between bumps 32 and the bottom edge of the nozzle body 26. This provides a highly flexible thin section in the bending area for good wiping action for the trailing lip and to insure the leading lip bends sufficiently to raise it on bumps 32.

When using hard floor cleaning unit 10, squeegee 22 is constantly stressed by bending and stretching and friction forces, and is in contact with cleaning solutions. Thus, squeegee 22 should be fabricated from a durable, flexible material that is not deleteriously affected by wetness and that can maintain its integrity during prolonged contact with cleaning solutions. The durability of squeegee 22 is of great importance, as it will be appreciated that squeegee 22 will be greatly manipulated (i.e., stressed) by the cleaning of even one moderately-sized hard floor, given the number of passes that must be made to cover the entire surface area thereof. Although squeegees are generally known in the art, these are commonly fabricated from materials that suffer from being more expensive than the present PVC/NBR formulations, and, further, from being worn down more quickly. Additionally, it has been found that floor cleaning units that employ a squeegee in conjunction with vacuum pressure, such as the unit just disclosed (FIGS. 1 and 2), suffer from being difficult to move across a surface, due to the friction between the squeegee and the floor. This resistance to movement is magnified by the fact that the squeegee is effectively suctioned to the floor by the vacuum. As will be shown in examples herein, the formulations of this invention overcome this problem of the prior art, while maintaining resistance to the detrimental effects of cleaning solutions.

For the contact members, including, by example, wheels 18, bumpers 20, and squeegee 22, a preferred PVC/NBR formulation is provided as follows:
(a) 100 parts by weight PVC;
(b) from about 20 to about 40 phr NBR;
(c) from about 60 to about 100 phr plasticizer;
(d) from about 1 to about 5 phr PVC stabilizer;
(e) from about 10 to about 15 phr epoxide plasticizer (e.g., soybean oil);
(f) from about 0.05 to about 0.4 phr internal lubricant (e.g., calcium stearate);
(g) from about 0.7 to about 1.5 phr external lubricant (e.g., erucamide wax); and
(h) from 1 to about 3 phr pigment (e.g., black concentrate).
Even more preferably, the PVC/NBR formulation includes:
(a) 100 parts by weight PVC;
(b) from about 25 to about 35 phr NBR;
(c) from about 70 to about 90 phr plasticizer;
(d) from about 2 to about 4 phr PVC stabilizer;
(e) from about 12 to about 14 phr epoxide plasticizer (e.g., soybean oil);
(f) from about 0.1 to about 0.3 phr internal lubricant (e.g., calcium stearate);
(g) from about 0.8 to about 1.2 phr external lubricant (e.g., erucamide wax); and
(h) from 1 to about 3 phr pigment (e.g., black concentrate).
In a particularly preferred embodiment, the contact members formulation includes:
(a) 100 parts by weight PVC;
(b) about 30 phr NBR;
(c) about 80 phr plasticizer;
(d) about 3 phr PVC stabilizer;
(e) about 13 phr epoxide plasticizer (e.g., soybean oil);
(f) about 0.2 phr internal lubricant (e.g., calcium stearate);
(g) about 1.05 phr external lubricant (e.g., erucamide wax); and
(h) about 2 phr pigment (e.g., black concentrate).

Sealing members can be of many different kinds. As used herein, "sealing member(s)" include seals between component parts of a floor cleaning unit, cushioning or dampening mounts for various floor cleaning unit parts, and valves controlling communication of fluid lines within floor cleaning units. Seals, mounts and valves are common in floor cleaning units, inasmuch as these units function on pressure differentials and the transport of fluids (liquids and/or gasses), and employ elements that require accommodations for their vibration (e.g., motors). Such sealing members within the floor cleaning unit art can be replaced with PVC/NBR compounds according to this invention, with benefits of cost savings and, in some instances, increased durability. Particular applications for sealing members fabricated from PVC/NBR compounds reside in the seals employed in hard floor cleaning units (e.g., the above-incorporated application Ser. No. 2003/0051310); upright carpet extractors, such as those disclosed in U.S. Pat. Nos. 5,500,977, 5,761,763, and 5,983,442, and pending U.S. patent application Ser. No. 10/165,731, filed Jun. 7, 2002; and bagged and bagless vacuums, such as, for example, those found respectively in U.S. Pat. No. 5,863,309 (Hard Bag Door with Air Directing Arrangement) and U.S. Pat. No. 6,385,810 (Latch Arrangement for a Vacuum Cleaner Dirt Receptacle). Each cited patent and patent application is incorporated herein in its entirety.

Rope seals are well known in the art as rope-like, compressible elements that are commonly employed as peripheral seals between two mating parts of an apparatus, wherein the periphery of the mating parts might be of a non-basic shape. In the floor cleaning units herein, rope seals are employed between vacuum cavities and associated bag doors, in vacuum cleaners, and between liquid recovery tanks and associated lids and suction nozzles and associated covers, in upright carpet extractors.

Figure 3:
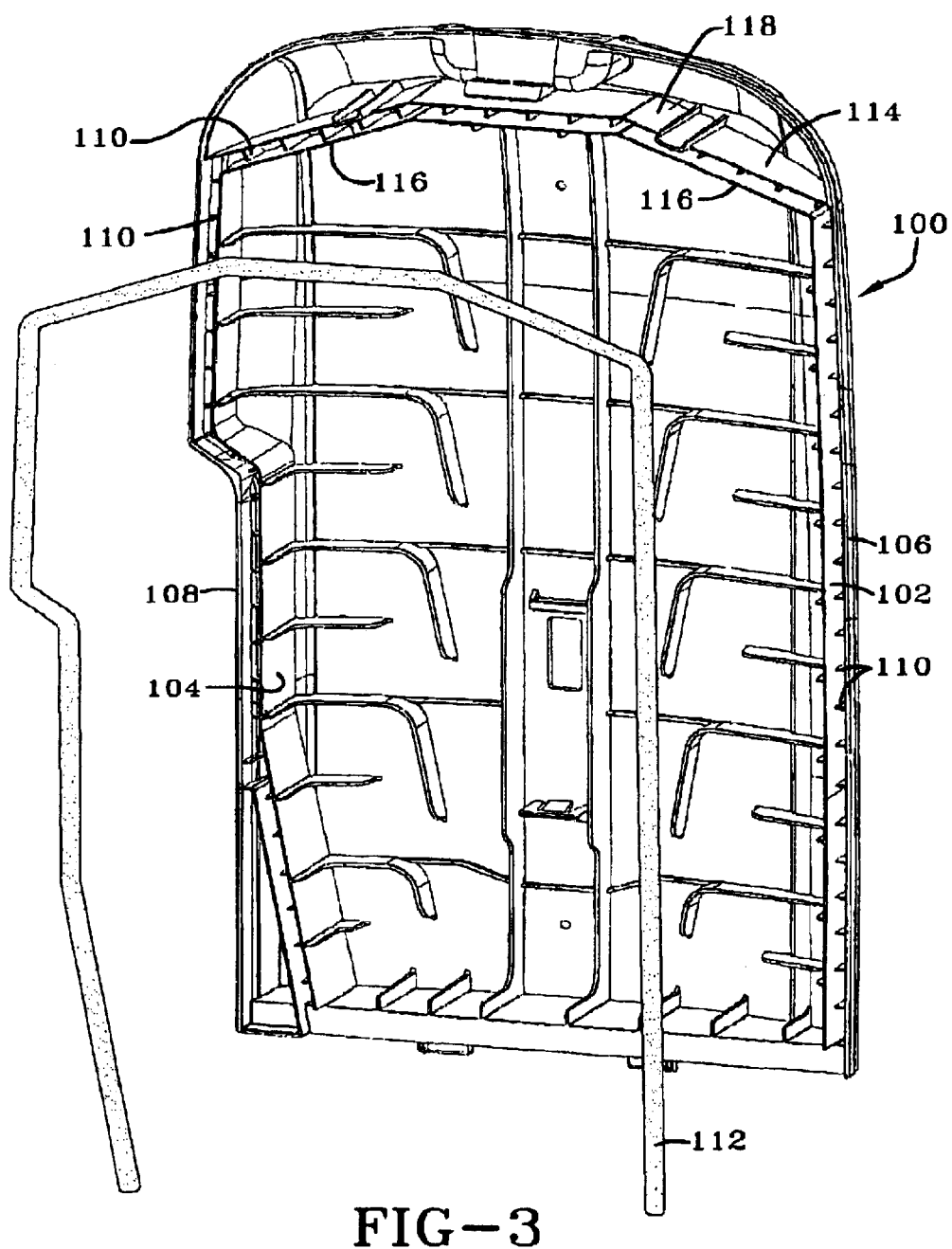
FIG. 3 is an inside perspective view of a bag door for a vacuum cavity of a floor cleaning unit.

Referring now to FIGS. 3, the hard bag door of U.S. Pat. No. 5,863,309 is shown, and it can be seen that bag door 100 includes inner vertical walls 102, 104 which are slightly inset from outer side walls 106, 108 and mirror them for nearly their total height. A series of short ribs 110 extend between the inner and outer walls 102–108 for bag door strengthening purposes and to form an inset seat for a peripheral rope seal 112 according to this invention. Rope seal 112 extends around and between the inner and outer walls 102–108 and also around a top portion 114 of bag door 100 formed by inner and outer walls 116, 118 of truncated peak form which also have short ribs 110 disposed therebetween. Bag door 100 fits over a vacuum cavity that houses a dirt bag, such that rope seal 112 is compressed between door 100 and a mating periphery of the vacuum cavity, to provide a fluid-tight seal that maintains the pressure differential necessary for the vacuum.

Referring now to FIGS. 4–7, rope seals for use in carpet extractors arc disclosed. Therein, the carpet extractor of U.S.

Pat. Nos. 5,500,977, and 5,761,763 is shown designated by numeral 200 and including a base frame assembly 202, which carries other components and sub-assemblies of the extractor 200; a handle assembly 204; a cleaning solution supply tank assembly 206; a recovery tank assembly 208; and a nozzle assembly 210, which provides a suction nozzle for extracting cleaning solution from carpet.

Figure 5:
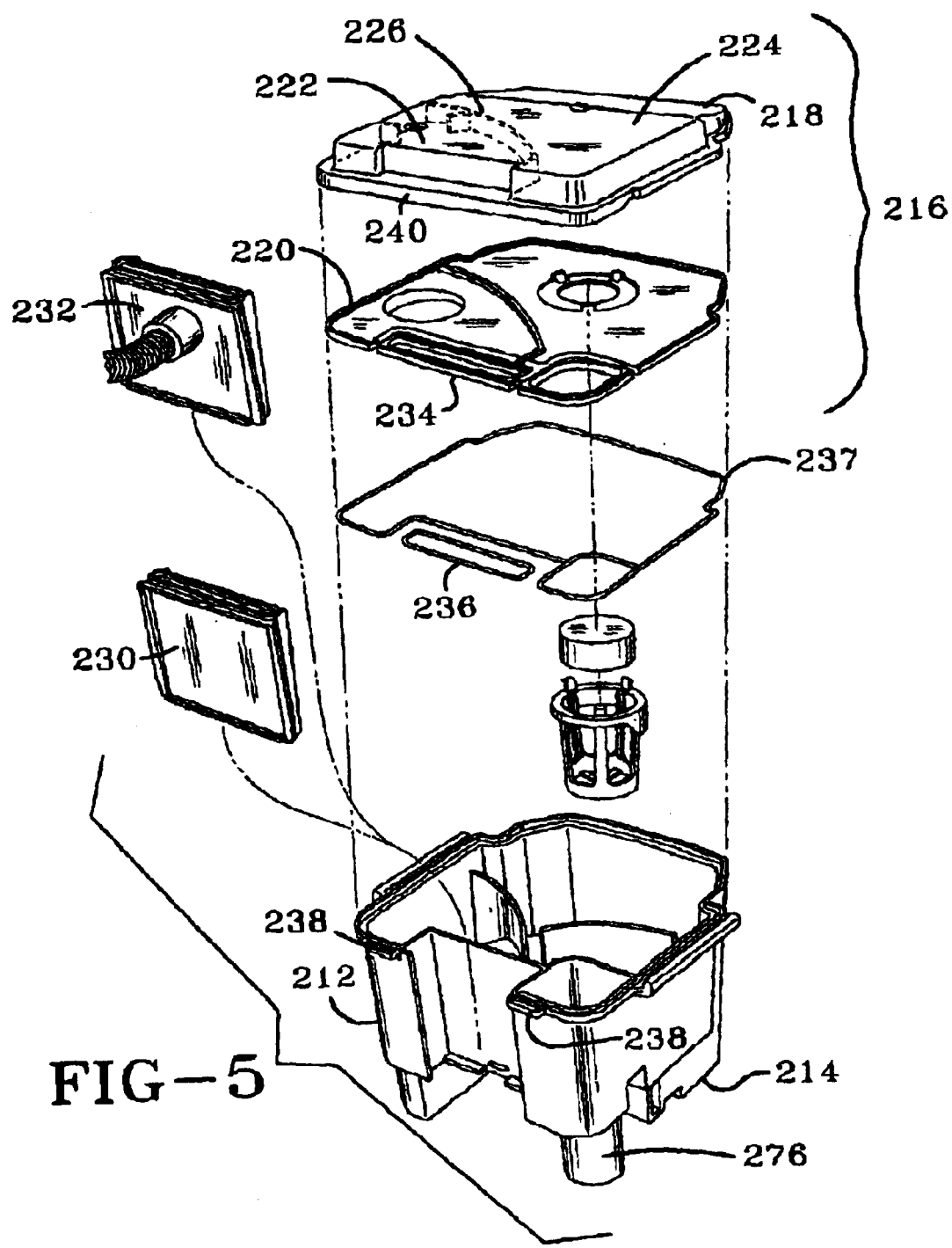
FIG. 5 is an exploded pictorial of the air/fluid separator and liquid recovery tank of the extractor of FIG. 4.
Figure 7:
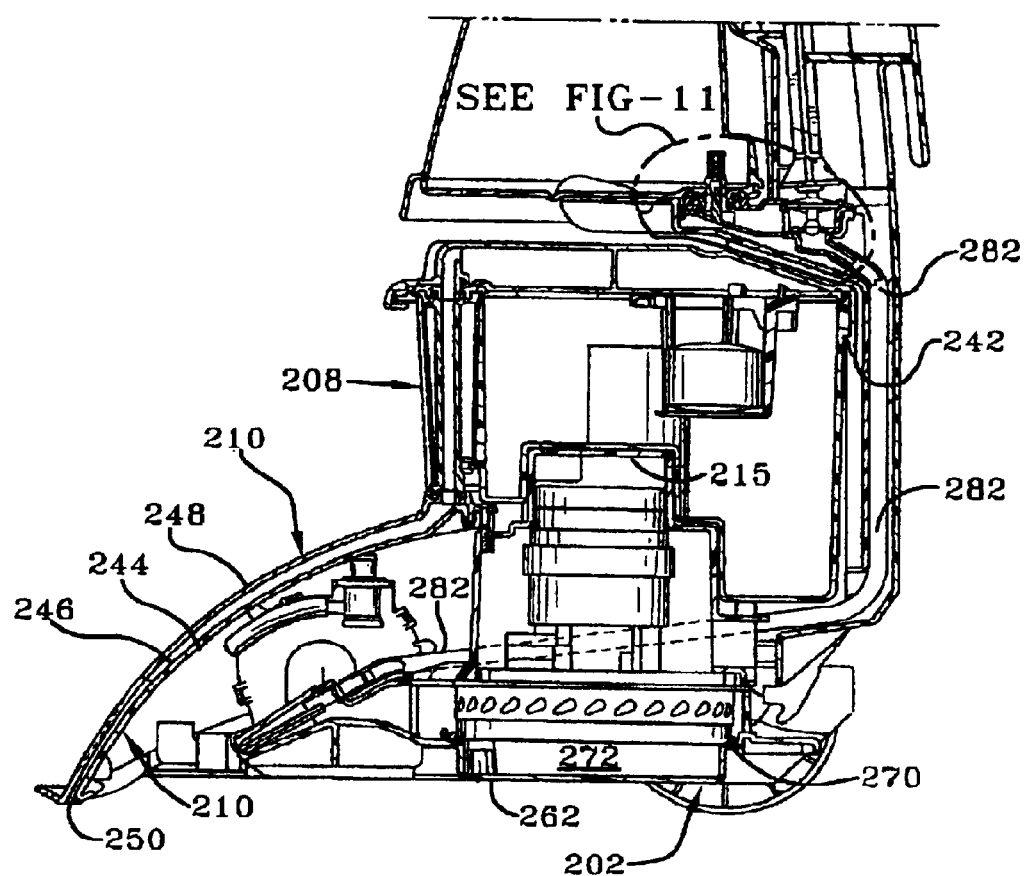
FIG. 7 is a side elevational cross-section taken vertically through the upright extractor to illustrate internal working elements.

Referring now to FIGS. 5 and 7, recovery tank assembly 208 generally comprises an open top tank 212 wherein the bottom 214 thereof is configured to set atop and surround the top portion of a motor cover 215, as best illustrated in FIG. 7. The recovery tank assembly 208 includes a lid assembly 216 that incorporates therein an air/fluid separator comprising a hollowed lid 218 and bottom plate 220 sealingly welded together forming a plenum therebetween. The plenum is divided into two separate and distinct chambers, an inlet chamber 222 and exit chamber 224, by separator wall 226 integrally molded into lid 218 and extending between lid 218 and bottom plate 220. Inlet chamber 228 fluidly communicates with floor cleaning module 230 or the upholstery/stair module 232 through inlet opening 234 in bottom plate 220. A rope seal 236 is employed between the module 230/232 and inlet opening 234. Rope seal 236 is compressed between module 230/232 and bottom plate 220 around the periphery of inlet opening 234 to provide a fluid-tight seal for the passage of cleaning solution being extracted. A rope seal 237 is also employed to provide a fluid-tight seal between lid assembly 216 and tank 212, with compression thereof being effected by clamping lid assembly 216 to tank 212, as, for example, by the engagement of tangs 238, in the forward rim 240 of lid 218 and a cantilevered latching tang 242 at the rear of tank 212.

Figure 6:
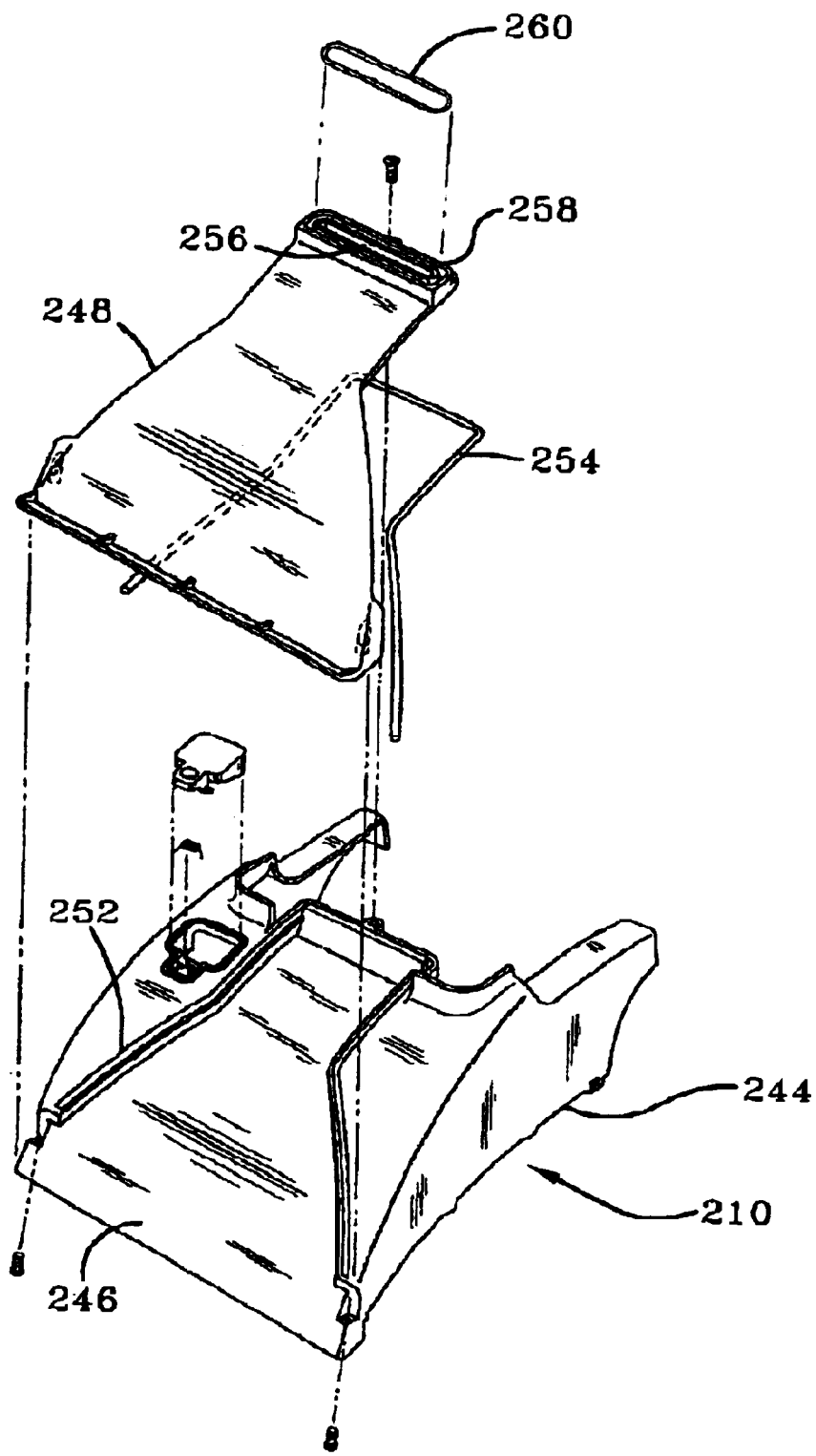
FIG. 6 is an exploded pictorial of the upright extractor's combined suction nozzle and hood.

With reference to FIGS. 6 and 7, nozzle assembly 210 encloses the front portion of base frame assembly 202, and comprises a front hood 244 having a depressed zone 246 which, in cooperation with nozzle cover 248, forms a suction nozzle having an elongated inlet slot 250 laterally extending the full width of hood 244. Extending around the perimeter of depressed zone 246 is groove 252, which receives therein rope seal 254. Rope seal 254 is compressed between the periphery of cover 248 that mates with groove 252, thereby limiting all air entry, into the composite suction nozzle, to slot 250. Cover 248 further incorporates therein an integrally molded elongate discharge opening 256 circumscribed by groove 258 having rope seal 260 therein for sealingly engaging a selected module 230/232 in a fluid-tight manner.

Other sealing elements that may benefit from use of the PVC/NBR formulations taught herein include standpipe seals, motor mount seals, valve tank seals and valve duct seals such as, for example, those found in the carpet extractors of U.S. Pat. Nos. 5,500,977, 5,761,763, 5,983,442.

Figure 8:
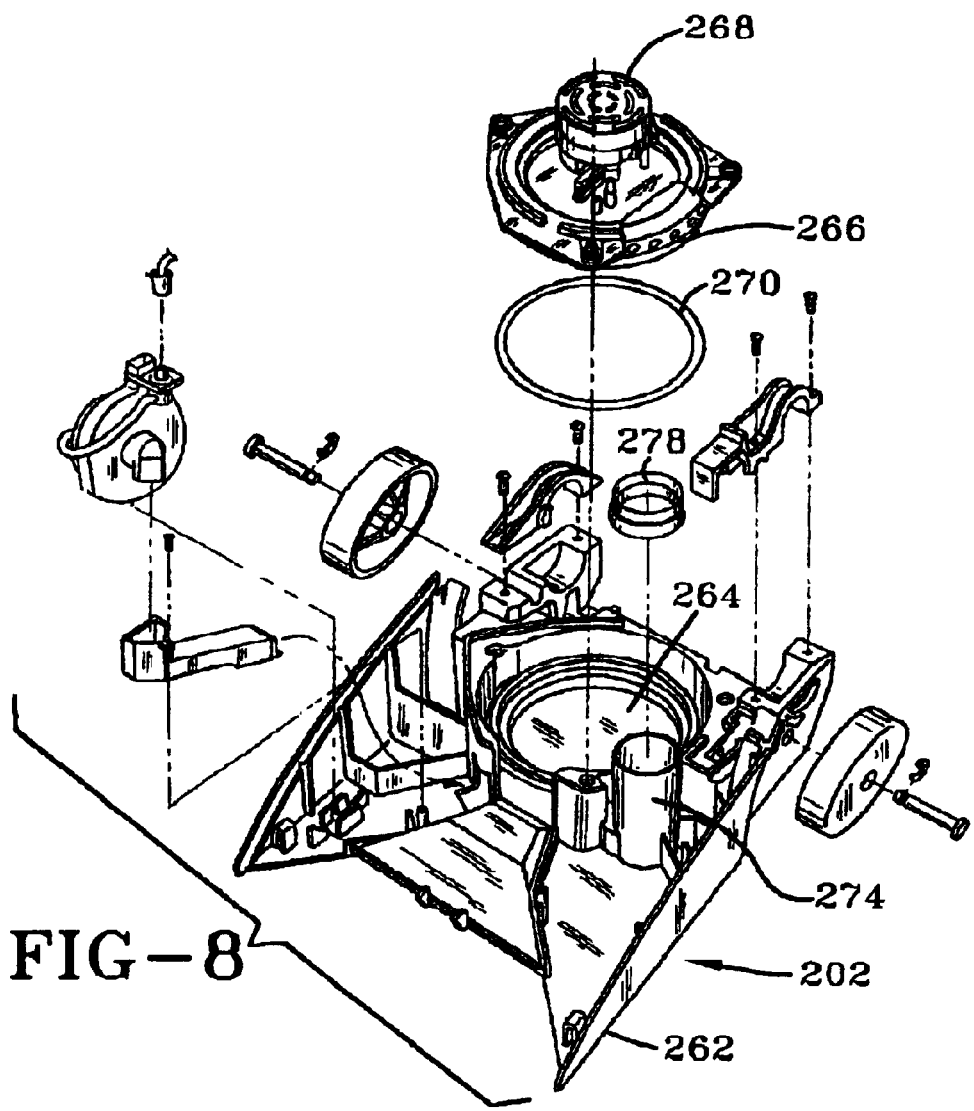
FIG. 8 is an exploded pictorial of the upright extractor's base frame.

Standpipe seals and a motor mount seals will be appreciated with reference to FIGS. 7 and 8. Base frame assembly 202 generally includes a unitary molded base frame 262 having a circular stepped basin 264 integrally molded therein and receiving therein the suction fan portion 266 of motor/fan assembly 268. The fan housing 266 of motor/fan assembly 268 rests upon the edge of stepped basin 264 having a motor mount seal 270 therebetween thereby forming an inlet air plenum 272 about the fan eye. Integrally molded into base frame 262 is lower stand pipe 274 which sealing engages exit stand pipe 276 of recovery tank 212 via cylindrical seal 278 when tank 212 is placed atop motor/fan assembly 268. Lower stand pipe 274 fluidly communicates with fan inlet plenum 272, thereby providing a vacuum source for recovery tank assembly 208.

Figure 9:
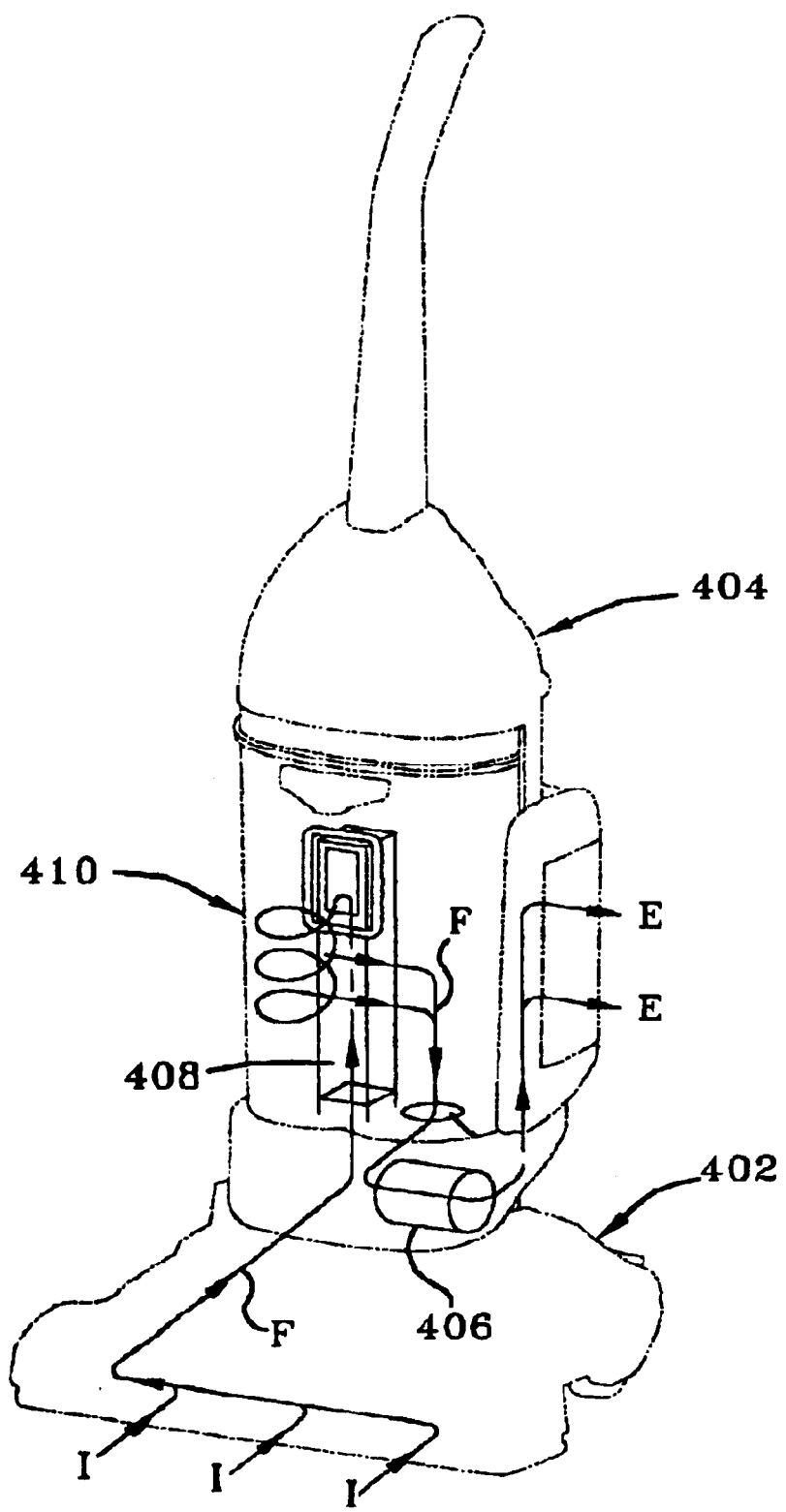
FIG. 9 is a perspective view of the vacuum cleaner diagrammatically represented in FIG. 10.
Figure 10:
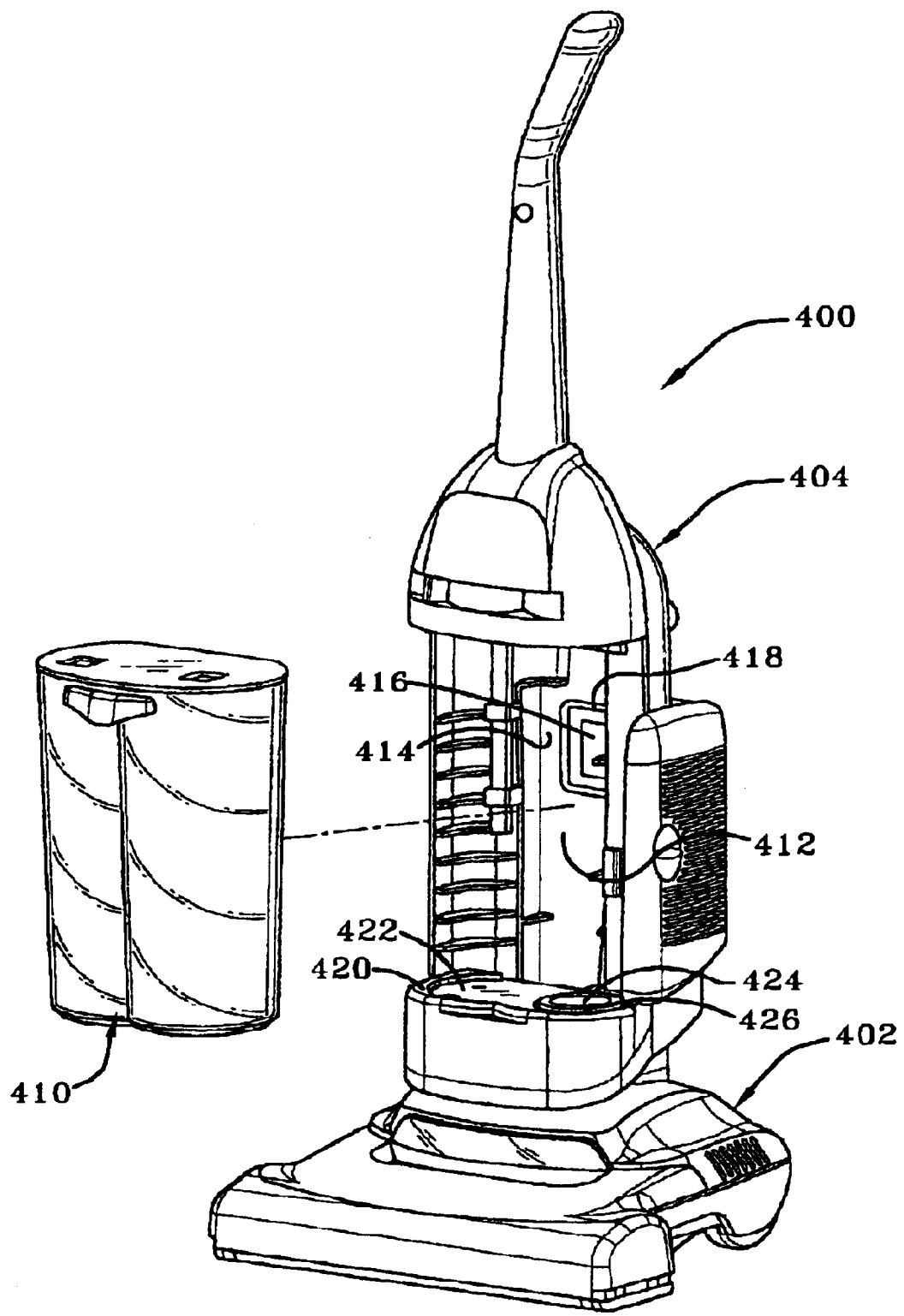
FIG. 10 is a diagrammatic view showing a bagless-type vacuum cleaner having certain parts fabricated from compositions according to this invention.

The PVC/NBR formulations herein may also be applied in bagless vacuums, such as, for example, the bagless vacuum of U.S. Pat. No. 6,385,810, generally depicted in FIGS. 9 and 10. Therein, bagless vacuum cleaner 400 includes a vacuum cleaner foot 402 and a vacuum cleaner housing 404 connected to the vacuum cleaner foot 402. Foot 402 is formed with a bottom suction nozzle inlet opening (not shown, but represented by Arrows I, in FIG. 9) which opens toward a floor surface. The nozzle opening also communicates with a conventional agitator (not shown) positioned within an agitator chamber. A motor-fan assembly 406 is positioned within the lower end of the housing 404 and is fluidly connected to the agitator chamber via a dirt duct in the foot (not shown), a dirt duct 408 on the housing 404, and a dirt cup 410. Motor-fan assembly 406 creates a suction that draws air and loosened dirt from the floor surface in through the nozzle opening and creates a stream of dirt-laden air which travels through the agitator chamber, the dirt ducts, the dirt cup (where the dirt is separated from the air and collected), the motor-fan assembly, and exhausted to atmosphere, as illustrated by arrows I (intake), F (flow) and E (exhaust), in FIG. 9. Dirt duct 408 extends up the rear of housing 404, and extends through an opening in the rear wall 412 into the cavity 414. The end of dirt duct 408 located in cavity 414 terminates in a dirt duct outlet opening 416. A dirt cup inlet seal 418, mounted to the rear wall 412, is positioned about the end of dirt duct 408 and forms an air tight seal with the dirt duct 408. The inlet seal also forms a face seal that seals against a rear wall of dirt cup 410, as described in further detail below. The bottom wall 420 of the cavity 414 is formed with a recessed area 422 for receiving and supporting dirt cup 410. A circular exhaust opening 424 is formed in the bottom wall 420. An outlet seal 426 mounted to the bottom wall extends about exhaust opening 424 and forms a face seal that seals against a bottom wall of dirt cup 410. Exhaust opening 424 communicates with the inlet of the motor-fan assembly 406.

Figure 4:
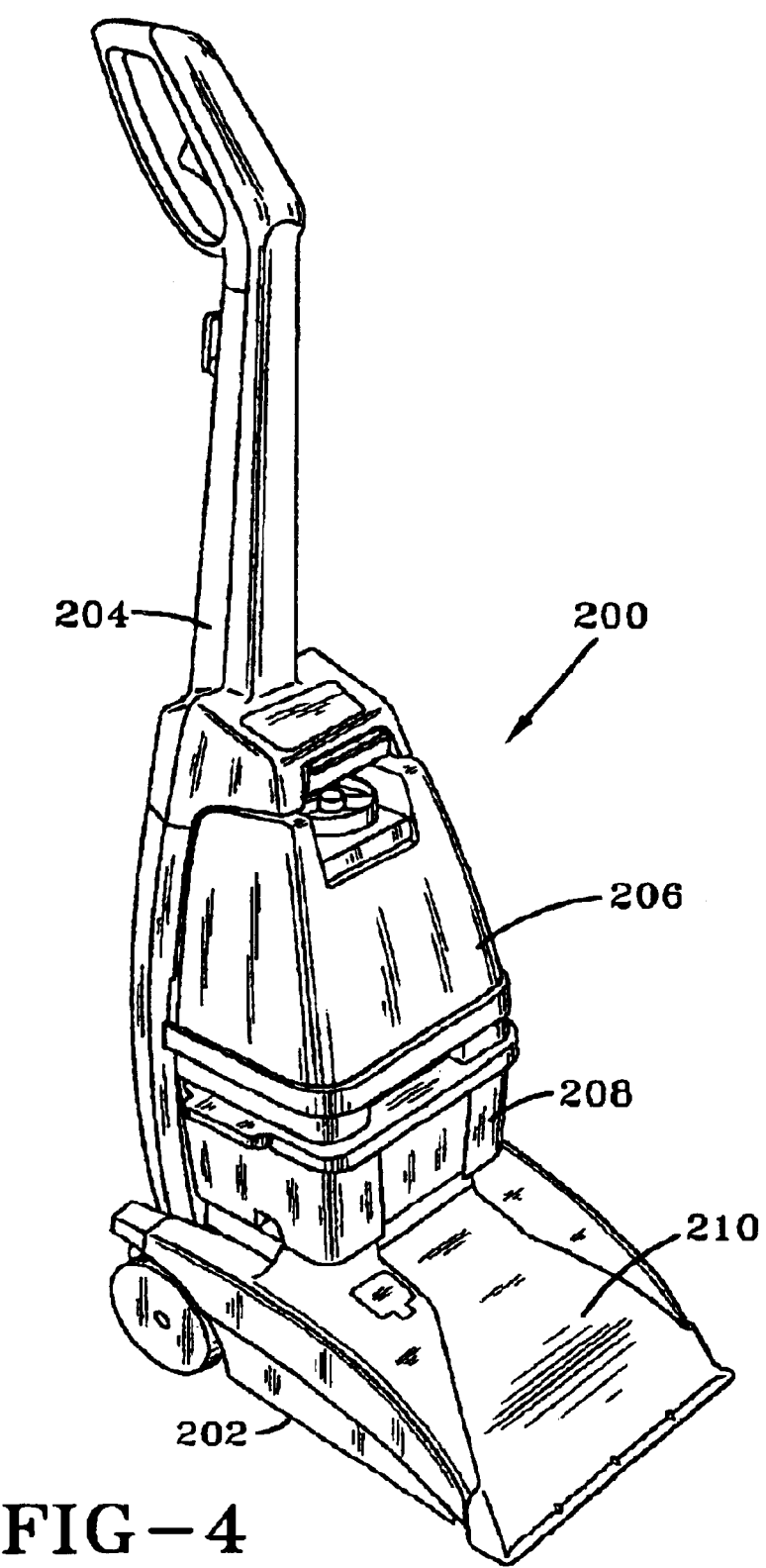
FIG. 4 is a perspective view of an example of an upright carpet extractor that having parts thereof formed of compositions according to this invention.
Figure 11:
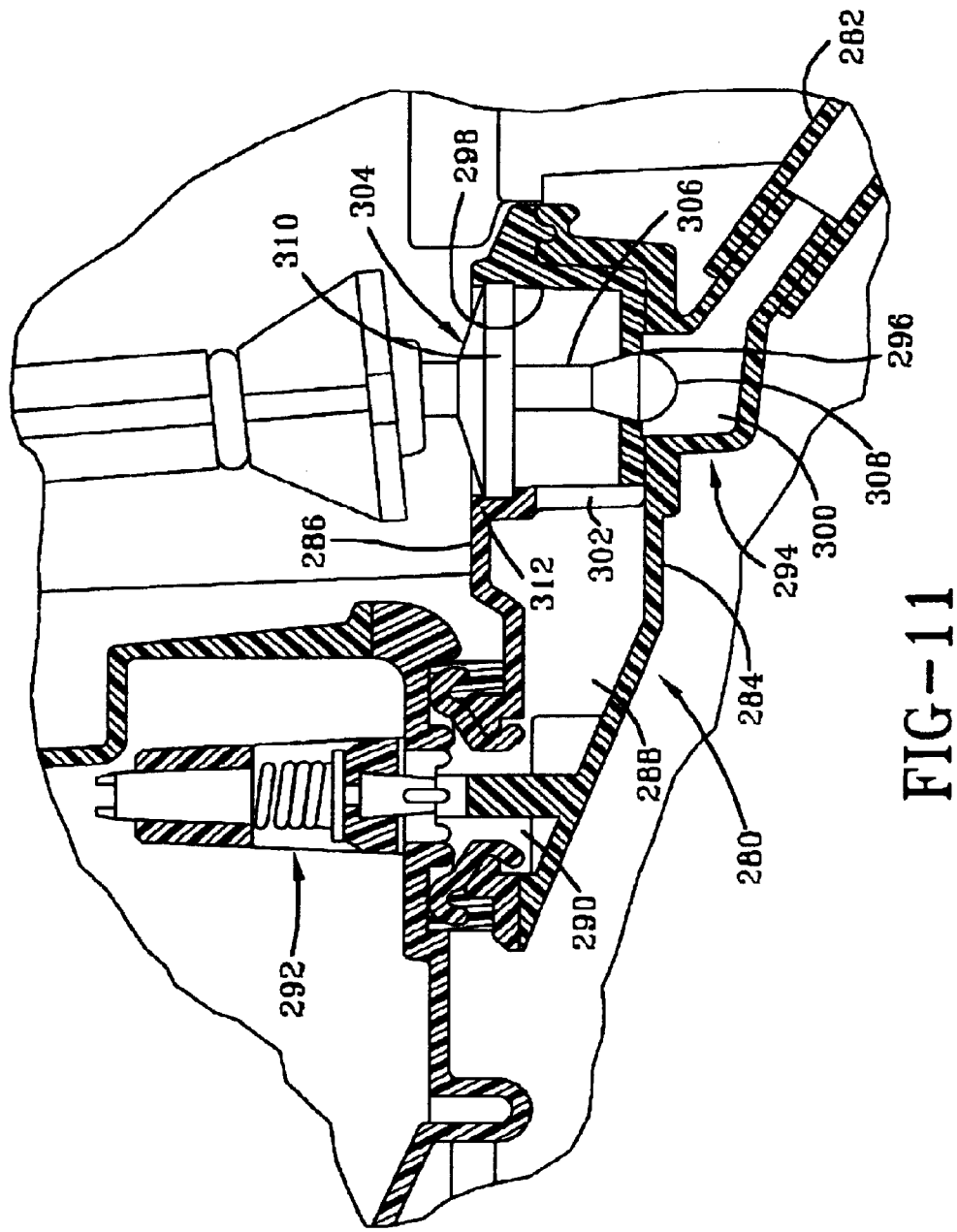
FIG. 11 is an enlarged cross-sectional view of the cleaning solution reservoir of the extractor of FIG. 7.

As already mentioned, valve members are considered a subset of "sealing members," as that term is used herein. A particular floor cleaning unit valve member that may be formulated according to this invention is structurally disclosed in the aforementioned carpet extractor U.S. Pat. Nos. 5,500,977, and 5,761,763. Reference is now made to FIGS. 4, 7, and 11, wherein it will be appreciated that a cleaning solution reservoir 280 receives and holds a quantity of cleaning solution from supply tank 206 for distribution through a first supply tube 282 and a second supply tube (not seen). Cleaning solution reservoir 280 includes a bottom concave basin 284, having the two supply tubes (282 and the one not viewed) exiting therefrom. Cover plate 286 is sealingly attached to basin 284 thereby forming reservoir volume 288, which supply tank 206 floods with cleaning solution through inlet port 290 and associated valve mechanism 292. Cleaning solution is released, upon operator demand, into tube 282 through solution release valve 294, which comprises valve seat 296 positioned in basin 284 of bowl 298 integrally formed with top cover 286. The basin 284 of bowl 298 extends across discharge port 300 such that valve seat 296 is aligned to open there into. An opening 302, within the wall of bowl 298, permits the free flow of cleaning solution from reservoir 288 into bowl 298. An elastomeric valve member 304 comprises an elongate piston 306 extending through valve seat 296 having a bulbous nose 308 at the distal end thereof within discharge port 300. The opposite end of piston 306 includes a downwardly sloped circular flange 310, the peripheral end of which frictionally and sealingly engages the upper circular rim 312 of bowl 298 thereby preventing leakage of cleaning solution thereby. Flange 310 acts to bias piston 306 upward thereby urging nose 308 into sealing engagement with valve seat 296, preventing the flow of cleaning solution from bowl 298 into discharge port 300 and tube 282.

It will be appreciated that the sealing members herein for floor cleaning units must be capable of sealing against fluids, whether gasses, liquids, or both, and thus must generally be of low durometer, preferably below about 60 Shore A. When sealing against the flow of cleaning solutions, the sealing member should also be resistant to cleaning compositions. With some sealing members, such as the rope seals disclosed above, it is desirable to provide the seal as a foamed part having closed cells of expanded gas therein, because an even softer component is desired. Although particular examples have been provided, the present invention is not to be limited to any particular seal or valve or mount disclosed.

For floor cleaning unit sealing members wherein a foamed sealing member is not necessarily desired, for example, in standpipe seals, valve duct seals, valve tank seals, inlet seals and motor mount seals, a preferred PVC/NBR formulation is provided as follows:

(a) 100 parts by weight PVC;
(b) from about 20 to about 40 phr of NBR;
(c) from about 60 to about 100 phr of plasticizer;
(d) from about 1 to about 5 phr of PVC stabilizer;
(e) from about 10 to about 15 phr of epoxide plasticizer; and
(f) from about 1 to about 3 phr pigment (e.g., black concentrate).

Even more preferably, the PVC/NBR formulation includes:

(a) 100 parts by weight PVC;
(b) from about 25 to about 35 phr of NBR;
(c) from about 70 to about 90 phr of plasticizer;
(d) from about 2 to about 4 phr of PVC stabilizer;
(e) from about 12 to about 14 phr of epoxide plasticizer; and
(f) from about 1 to about 3 phr pigment (e.g., black concentrate).

Most preferably, the sealing members formulation includes:

(a) 100 parts by weight PVC;
(b) about 30 phr of NBR;
(c) about 80 phr of plasticizer;
(d) about 3 phr of PVC stabilizer;
(e) about 13 phr of epoxide plasticizer; and
(f) about 2 phr pigment (e.g., black concentrate).

Lubricants may be employed in the formulation for the sealing members when it is desired to facilitate molding of these parts. Thus, the above formulations may be altered to include internal and external lubricants. Preferably, the formulations could include from about 0.05 to about 0.4 phr internal lubricant (e.g., calcium stearate), more preferably from about 0.1 to about 0.3 phr internal lubricant, and, in a particularly preferred embodiment, about 0.2 phr internal lubricant. Preferably the formulations would include from about 0.7 to about 1.5 phr external lubricant (e.g., erucamide wax), more preferably from about 0.9 to about 1.2 phr external lubricant, and, in particularly preferred embodiments, about 1.05 phr external lubricant.

For floor cleaning unit sealing members wherein a foamed sealing member is desired, such as rope seals like those disclosed above, the PVC/NBR formulation that is particularly preferred is provided as follows:

(a) 100 parts by weight PVC;
(b) from about 20 to about 40 phr of NBR;
(c) from about 75 to about 125 phr of plasticizer;
(d) from about 1 to about 5 phr of PVC stabilizer;
(e) from about 10 to about 15 phr of epoxide plasticizer (e.g., soybean oil);
(f) from about 0.5 to about 1.5 phr of blowing agent (e.g., azodicarbonamide); and
(g) from about 1 to about 3 phr of pigment (e.g., black concentrate).

Even more preferably, the PVC/NBR formulation includes:

(a) 100 parts by weight PVC;
(b) from about 25 to about 35 phr of NBR;
(c) from about 85 to about 95 phr of plasticizer;
(d) from about 2 to about 4 phr of PVC stabilizer;
(e) from about 12 to about 14 phr of epoxide plasticizer (e.g., soybean oil);
(f) from about 0.75 to about 1.25 phr of blowing agent (e.g., azodicarbonamide); and
(g) from about 1 to about 3 phr of pigment (e.g., black concentrate).

In a particularly preferred embodiment for foamed sealing members, the formulation includes:

(a) 100 parts by weight PVC;
(b) about 30 phr of NBR;
(c) about 100 phr of plasticizer;
(d) about 3 phr of PVC stabilizer;
(e) about 13 phr of epoxide plasticizer (e.g., soybean oil);
(f) about 1.0 phr of blowing agent (e.g., azodicarbonamide); and
(g) about 2.0 phr of pigment (e.g., black concentrate).

Some of the flexible tubing currently employed in various floor cleaning units will benefit from being created from the formulations disclosed herein. For instance, tubing 282, already mentioned, could be provided as a PVC/NBR thermoplastic composition according to this invention. Indeed, in carpet extractors, the PVC/NBR formulations of this invention may be employed for the flexible tubing that serves to transport cleaning solution from the cleaning solution reservoir (such as reservoir 280) to the nozzle assembly (such as assembly 210), where the cleaning solution is sprayed onto a surface to be cleaned. Furthermore, the PVC/NBR formulations of this invention may be employed for the flexible tubing that serves to transport cleaning solution, from its extraction (by the nozzle assembly) from the surface being cleaned, to the recovery tank (such as tank 208).

For tubing within floor cleaning units, the PVC/NBR formulation that is particularly preferred is provided as follows:

(a) about 100 parts by weight PVC;
(b) from about 20 to about 40 phr of NBR;
(c) from about 50 to about 80 phr of plasticizer;
(d) from about 1 to about 5 phr of PVC stabilizer;
(e) from about 3 to about 8 phr of epoxide plasticizer;
(f) from about 5 to about 15 phr filler;
(g) from about 0.05 to about 0.4 phr internal lubricant (e.g., calcium stearate);
(h) from about 0.5 to about 1.2 phr external lubricant (e.g., erucamide wax); and
(i) from about 1.0 to abut 3.0 phr of pigment (e.g., black concentrate).

A more preferable formulation is provided below:
- (a) 100 parts by weight PVC,
- (b) from about 25 to about 35 phr of NBR;
- (c) from about 60 to about 70 phr of plasticizer;
- (d) from about 2 to about 4 phr of PVC stabilizer;
- (e) from about 4 to about 6 phr of epoxide plasticizer;
- (f) from about 8 to about 12 phr filler;
- (g) from about 0.1 to about 0.3 phr internal lubricant (e.g., calcium stearate);
- (h) from about 0.7 to about 1.0 phr external lubricant (e.g., erucamide wax); and
- (i) from about 0.1 to about 0.3 phr of pigment (e.g., black concentrate).

A particularly preferred formulation includes:
- (a) 100 parts by weight PVC;
- (b) about 30 phr of NBR;
- (c) about 65 phr of plasticizer;
- (d) about 3 phr of PVC stabilizer;
- (e) about 5 phr of epoxide plasticizer;
- (f) about 10 phr calcium carbonate as filler;
- (g) about 0.2 phr internal lubricant (calcium stearate);
- (h) about 0.85 phr external lubricant (erucamide wax); and
- (i) about 2.0 phr of pigment (black concentrate).

EXPERIMENTAL

Solution Testing

A PVC/NBR sample was produced according to the following formulation (herein below Formulation I):
- (a) 100 parts by weight PVC resin (240F Resin™ (Oxyvinyls, USA));
- (b) 30 phr of NBR (Baymod N XL 34.19™ (Bayer Corporation. USA));
- (c) 80 phr of plasticizer (Jayflex 251™ (Exxon Mobile, USA));
- (d) 3 phr of PVC stabilizer;
- (e) 13 phr of epoxide plasticizer (soybean oil);

The method of production corresponded to the method disclosed herein above.

The integrity of this PVC-based material was separately tested in vinegar and in Lysol™ and Old English™ floor cleaners. Particularly, individual samples of the PVC-based material were submerged in concentrated solutions of vinegar (4% acetic acid), Lysol (at 4.35% solids), and Old English (at 3.1% solids) for 7 days, at room temperature, and, thereafter, the solutions and submerged samples were placed in a furnace, their temperature was raised to 130 F., and they remained at this temperature for 7 days in order to observe whether or not cracks would be evident. Thereafter, the temperature was raised to 160 F., for a time period of 7 days, to test for visible cracks and ductility.

No visible cracks were evident in the samples after being submerged in their respective concentrated solutions for 7 days at room temperature. No visible cracks were evident in the samples after being submerged in their respective concentrated solutions for 7 days at 130 F. No visible cracks were evident in the samples after being submerged in their respective solutions for 7 days at 160 F., although the sample submerged in the Lysol and the sample submerged in the Old English were stiffer and harder to bend back and forth than the sample that was submerged in vinegar.

Valve Ducts and Standpipe Seals

A PVC/NBR sample was produced according to the above Formulation I, and formed into a valve duct seal and standpipe seal in an upright carpet extractor for comparison against the Santoprene™ seals that are commonly employed. The method of production corresponded to the method disclosed herein above.

Under standard conditions, the performance of the PVC/NBR-based standpipe and valve duct seals in the upright carpet extractor was comparable to the performance of Santoprene™-based standpipe and valve duct seals in upright carpet extractors. Testing the seals at 157 F., for a duration of 7 days, did reduce the performance of the PVC/NBR seals, while the Santoprene™ seals were unaffected. The performance drop for the PVC/NBR seals ranged from 0.8 to 5.8 inches of water, and even with this small performance reduction, the PVC/NBR formulation is acceptable for use in standpipe and valve duct seals.

Rope Seals

A foamed PVC/NBR sample was produced according to the following formulation (Formulation II) and formed into a rope seal for a bag door of a vacuum cleaner for comparison against the neoprene sponge-type rope seals that are commonly employed:
- (a) 100 parts by weight PVC (240F Resin™ (Oxyvinyls, USA));
- (b) 30 phr of NBR (Baymod N XL 34.19™ (Bayer Corporation, USA));
- (c) 100 phr of plasticizer (Jayflex 251™ (Exxon Mobile, USA));
- (d) 3 phr of PVC stabilizer;
- (e) 13 phr of epoxide plasticizer (soybean oil);
- (f) 1 phr of blowing agent (azodicarbonamide); and
- (g) 2.0 phr of pigment (black concentrate).

The method of production corresponded to the method disclosed herein above.

The bag door in a control vacuum cleaner was sealed with a neoprene-based rope seal, and a test vacuum cleaner bag door was sealed with the rope seal of Formulation II. Airflow to the hose of the vacuum cleaners was controlled by an orifice, and a water manometer was placed between the cleaner and the orifice to measure the vacuum. The PVC/NBR-based rope seal performed at up to 63.4 inches of water, compared to the neoprene-based rope seals, which performed at up to 63.8 inches of water.

Inlet Seals

A PVC/NBR sample was produced according to the above Formulation I and formed into an inlet seal in a bagless vacuum cleaner for comparison against the Santoprene™ seals that are commonly employed:
- (a) 100 parts by weight PVC resin (240F Resin™ (Oxyvinyls, USA));
- (b) 30 phr of NBR (Baymod N XL 34.19™ (Bayer Corporation, USA));
- (c) 80 phr of plasticizer (Jayflex 251™ (Exxon Mobile, USA));
- (d) 3 phr of PVC stabilizer;
- (e) 13 phr of epoxide plasticizer (soybean oil);

The method of production corresponded to the method disclosed herein above.

The suction performance between the PVC/NBR-based inlet seal and the common inlet seal was compared, and the PVC/NBR inlet seal achieved substantially similar results. The PVC/NBR inlet seal was also subjected to oven aging and, thereafter, again tested for suction performance. The suction performance after the oven aging was 1 inch of water less than the pre-aging performance, a relatively insignificant drop. There were also no adverse affects on the PVC/NBR inlet seal when it was introduced to talc powder.

Tubing

A PVC/NBR sample was produced according to the following formulation (Formulation III) and formed into tubing in an upright carpet extractor for comparison against the Santoprene™ tubing that is commonly employed:

(a) 100 parts by weight PVC (240F Resin™ (Oxyvinyls, USA));
(b) 30 phr of NBR (Bayer Corporation, USA));
(c) 65 phr of plasticizer (DIDP-E);
(d) 3 phr of PVC stabilizer;
(e) 5 phr of epoxide plasticizer (soybean oil);
(f) 10 phr calcium carbonate as filler;
(g) 0.2 phr internal lubricant (calcium stearate);
(h) 0.85 phr external lubricant (erucamide wax); and
(g) 2.0 phr of pigment (black concentrate).

The method of production corresponded to the method disclosed herein above.

The first test involved analyzing the life of the tubing in The Hoover Company's Steam Vac™ Carpet/Upholstery Detergent cleaning solutions (mixed at 5 ounces detergent per gallon of water). Six upright carpet extractor units with the above-formulated PVC/NBR tubing were tested by running cleaning solution through the tubing for 40 hours. The tubing performed satisfactorily, and no problems were encountered. The flexibility of the tubing was also tested through a handle reciprocator test, wherein the handle of the upright carpet extractor was pivoted through 33,000 cycles through its full range of motion from completely upright to nearly parallel to the work surface. This tests the durability and flexibility of the tubing because the tubing extends through the area where the handle pivots, and is thus bent and flexed as the handle is pivoted. After 33,000 cycles, the PVC/NBR tubing showed no significant wear. The flow of water through the PVC/NBR tubing was also tested, and it was found that both the Santoprene™ and PVC/NBR tubing had a flow rate of 0.25 gallons/minute.

Squeegee Durability Testing

A PVC-based squeegee was compared to a Santoprene™-based squeegee in use in a hard floor cleaning unit, such as that disclosed in pending application Ser. No. 2003/0051310, of Mar. 20, 2003, and discussed above (FIGS. 1 and 2), particularly the Floormate™ cleaner (The Hoover Company, Ohio, USA). Notably, the Santoprene™ squeegee is the prior art squeegee commonly employed before practice of this invention. The PVC-based squeegee was made from the following PVC/NBR formulation (Formulation IV—this formulation is similar to Formulation I and includes lubricants):

(a) 100 parts by weight PVC (240F Resin™ (Oxyvinyls, USA));
(b) 30 phr NBR (Bayer Corporation, USA));
(c) 80 phr plasticizer (Jayflex 251™ (Exxon Mobile, USA));
(d) 3 phr PVC stabilizer;
(e) 13 phr epoxide plasticizer (soybean oil);
(f) 0.2 phr internal lubricant (calcium stearate);
(g) 1.05 phr external lubricant (erucamide wax); and
(h) 2 phr pigment (black concentrate).

Both the Santoprene™ squeegee and the PVC-squeegee were identical but for their formulations (i.e, they had identical physical structure).

In the hard floor cleaning unit, these squeegees are suctioned to the surface being cleaned, and it is therefore necessary that, despite the suction, the squeegee be able to be moved along the surface without a great deal of effort by the user. Thus, a subjective comparison of the effort required to operate the hard floor cleaning units was undertaken, and the results are provided in Table 1. Therein, a higher number indicates more work to move the squeegee across the surface. It will be appreciated that the PVC/NBR-based squeegee required a reduced amount of effort to move the floor cleaning unit across the floor and produced a more uniform clean surface appearance than the Santoprene™ squeegee.

TABLE 1

|  | Cherry Wood Flooring | Vinyl Flooring (large) | Vinyl Flooring (small) | Research Board Vinyl Flooring | Tile Flooring | Total | Average |
| --- | --- | --- | --- | --- | --- | --- | --- |
| Operated dry |  |  |  |  |  |  |  |
| Steel gray squeegee | 7 | 5 | 5 | 6 | 7 | 30 | 6 |
| Hatarus blue squeegee | 9 | 8 | 8 | 9 | 9.5 | 43.5 | 8.7 |
| Compound with wax sample 1 | 6 | 3 | 4 | 5 | 5 | 23 | 4.6 |
| Compound with wax sample 2 | 7 | 4 | 5 | 5 | 5 | 26 | 5.2 |
| Operated wet |  |  |  |  |  |  |  |
| Steel gray squeegee | 6 | 3 | 4 | 3 | 4 | 20 | 4 |
| Hatarus blue squeegee | 6 | 5 | 5 | 6 | 3 | 25 | 5 |
| Compound with wax sample 1 | 2 | 3 | 3 | 3 | 3 | 14 | 2.8 |
| Compound with wax sample 2 | 3 | 3 | 4 | 3 | 3 | 16 | 3.2 |

Physical Property Testing: Formulation I

Four PVC/NBR batches were prepared according to the above Formulation I, and were evaluated and compared against Santoprene™ compounds, Santoprene™ 201-55 and Santoprene™ 111-45. Formulation I showed better tensile and elongation results, and, at room temperature, had compression sets comparable to the Santoprene™ compounds. At elevated temperatures, the Santoprene™ exhibited better compression results.

Durometer, compression, tensile and elongation testing was done for all Formulation I batches and for the two Santoprene™ formulations. Different sample preparations were tried to see how sample preparation affected the test results. In Table 2 below, Shore A durometer readings were taken with a freestanding Shore A durometer, and the median of five readings is reported as the result. Sample dimensions for the durometer tests were 0.25×0.75×2.5 inches (note, two slabs of 0.0125" thick were layered to form the final test sample). Compression set was tested according to ASTM D395, Method B, Type 1 Specimen, and samples were milled, pressed into 0.125" slabs, and discs were cut from the slabs with a 1.12" punch and stacked 4 layers high. The samples were removed from the oven and allowed to set for 30 minutes before they were re-measured. Compression set was computed according to the following equation: % compression set=((original thickness−final thickness)/(original thickness−compression thickness))×100. The "% compression set" is a percentage of the original deflection. Compression set was ran at room temperature and at 70°C. (158° F.).

were re-measured. Compression set was computed according to the following equation: % compression set=((original thickness−final thickness)/(original thickness−compression thickness))×100. The "% compression set" is a percentage of the original deflection. Compression set was run at 100° C. for 22 hours.

For 4 samples, the median of 5 durometer tests is provided in Table 3.

TABLE 3

| Sample | 1 | 2 | 3 | 4 | 5 | Median |
|---|---|---|---|---|---|---|
| A | 73 | 72 | 73 | 72 | 72 | 72.4 |
| B | 72 | 71 | 72 | 73 | 71 | 71.8 |
| C | 72 | 72 | 73 | 71 | 73 | 72.2 |
| D | 71 | 72 | 72 | 71 | 72 | 71.6 |

The compression set for 2 samples is provided in Table 4.

TABLE 2

RESULTS

| Sample | Sample Type | Durometer Shore A | % Compression Room Temp. | % Compression 70° C. | Ave. Tensile Room Temp. | Ave. Elong Room Temp |
|---|---|---|---|---|---|---|
| XLS, Batch 1 | Milled | 51 | 17 | 51 | 2721 | 521 |
| XLS, Batch 2 | Milled | 53 | 19 | 49 | 2575 | 519 |
| XLS, Batch 3 | Milled | 49 | 22 | 65 | 1585 | 345 |
| XLS Batch 3 | Molded | 55 | N/A | N/A | 1055 | 228 |
| XLS, Batch 4 | Milled | 55 | 15 | 66 | 1439 | 330 |
| Santoprene ™ A201-55 | Milled | 58 | 16 | 22 | N/A | N/A |
| Santoprene ™ 201-55 | Molded | 55 | N/A | N/A | 528 | 167 |
| Santoprene ™ 111-45 | Molded | 45 | 20 | 32 | 386 | 166 |

Physical Property Testing: Formulation II

The physical properties of Formulation III were tested, particularly, durometer, compressions set, and specific gravity. All durometer tests were taken with a Freestanding Shore A durometer, and the median of five readings is reported as the result. Sample dimensions for the durometer tests were 0.25×0.75×2.5 inches (note, two slabs of 0.0125" thick were layered to form the final test sample). Compression set was tested according to ASTM D395, Method B, Type 1 Specimen, and samples were milled, pressed into 0.125" slabs, and discs were cut from the slabs with a 1.12" punch and stacked 4 layers high. The samples were removed from the presses and allowed to set for 30 minutes before they

TABLE 4

| Sample | Initial Thickness | Compressed Thickness | Final Thickness | Compression Set (%) |
|---|---|---|---|---|
| Tubing XL-X 1 | 0.548 | 0.411 | 0.436 | 82 |
| Tubing XL-X 2 | 0.55 | 0.413 | 0.442 | 79 |

What is claimed is:

1. A floor cleaning unit comprising:
    a foamed sealing member including a polyvinyl chloride base resin, and, based upon 100 parts by weight of said polyvinyl chloride base resin:
    (a) from about 20 to about 40 phr of nitrile rubber, (b) from about 75 to about 125 phr of plasticizer,
(c) from about 1 to about 5 phr of polyvinyl chloride stabilizer,
(d) from about 10 to about 15 phr of epoxide plasticizer,
(e) from about 0.5 to about 1.5 phr of blowing agent.

2. The floor cleaning unit of claim 1, wherein, based upon 100 parts by weight of said polyvinyl chloride base resin, said foamed sealing member includes:

(a) from about 25 to about 35 phr of nitrile rubber,
(b) from about 85 to about 95 phr of plasticizer,
(c) from about 2 to about 4 phr of polyvinyl chloride stabilizer,
(d) from about 12 to about 14 phr of epoxide plasticizer,
(e) from about 0.75 to about 1.25 phr of blowing agent.

3. The floor cleaning unit of claim 1, wherein, based upon 100 parts by weight of said polyvinyl chloride base resin, said foamed sealing member includes:

(a) about 30 phr of nitrile rubber,
(b) about 100 phr of plasticizer,
(c) about 3 phr of polyvinyl chloride stabilizer,
(d) about 13 phr of epoxide plasticizer,
(e) about 1 phr of blowing agent.

* * * * *